May 27, 1924.
J. B. SHAW ET AL
1,495,813
PROCESS OF CALCINING ROCKS
Filed Aug. 27, 1920
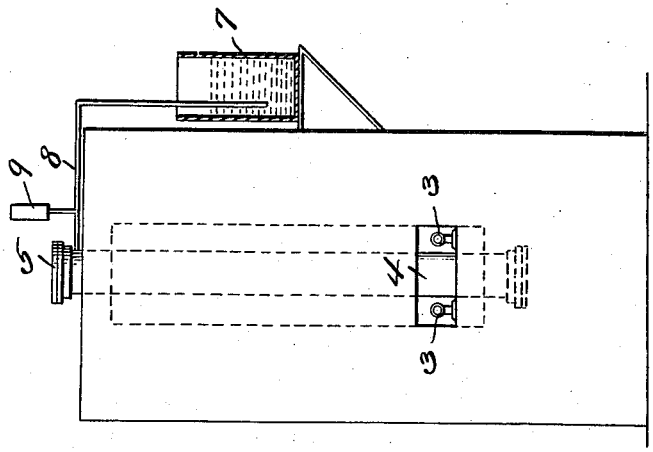
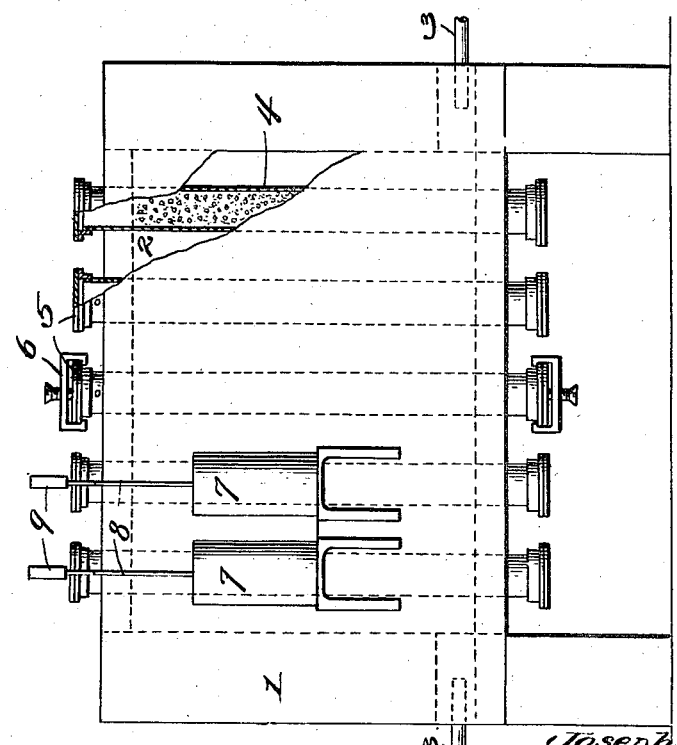
Inventors
Joseph B. Shaw
George A. Bote Patented May 27, 1924.

1,495,813

UNITED STATES PATENT OFFICE.

JOSEPH B. SHAW AND GEORGE A. BOLE, OF ALFRED, NEW YORK.

PROCESS OF CALCINING ROCKS.

Application filed August 27, 1920. Serial No. 406,481.

*To all whom it may concern:*

Be it known that we, JOSEPH B. SHAW and GEORGE A. BOLE, citizens of the United States, residing at Alfred, in the county of Allegany and State of New York, have invented new and useful Improvements in Processes of Calcining Rocks, of which the following is a specification.

Our present invention relates to improvements in the art of calcining rocks and more particularly to the calcining of dolomites or magnesium bearing lime stones, in order to obtain magnesium oxide therefrom.

Heretofore magnesium oxide has been obtained largely from magnesite as a raw material, but owing to the increasing demands for magnesium oxide for use in the industries and the circumstance that magnesite, the raw material from which magnesium oxide has heretofore been obtained largely, is found only in widely scattered localities, and hence is obtainable only at a relatively high price, whereas the dolomites or magnesium bearing lime stones are found abundantly in nearly all localities, it has become highly important and desirable that the dolomites or magnesium bearing lime stones be used as a source of magnesium oxide.

Methods heretofore proposed for obtaining the oxide from magnesium lime stone have not produced a product which is satisfactory for many purposes, owing to its content of lime.

The method heretofore used generally to obtain magnesium oxide from rocks containing magnesium carbonate consisted in calcining the rock at a low temperature so that most of the magnesium carbonate is decomposed, leaving the magnesium oxide and also leaving the greater part of the calcium carbonate undecomposed. The magnesium oxide may be used together with the other materials with which it is found, after such calcination, as, for example, in the manufacture of oxychloride cements, or the magnesium oxide may be separated from the other materials, after such calcination, when used, as for example, in the manufacture of refractory products.

For some purposes, it is permissible that the decomposition of the magnesium carbonate be imcomplete and that some of the calcium carbonate be broken down into free lime (CaO). For other purposes it is essential to the success of the product, as, for example, in the manufacture of oxychloride cements, that there be no lime present in the calcined material. It has been found, in using the present processes of calcination, that if all the magnesium carbonate were decomposed, some of the calcium carbonate was also decomposed; and that if such low temperatures were used as to decompose the calcium carbonate only to a slight extent, then the magnesium carbonate was only partially decomposed after a long heat treatment. All of the processes heretofore used take into account only the temperature of calcination without any control of the pressure of the products of the decomposition.

We have discovered that by controlling the pressure, as well as the temperature of the materials undergoing calcination, the magnesium carbonate can be completely decomposed, while the other principal constituent in these stones, viz:—calcium carbonate remains entirely undecomposed. The reason for this phenomenon is based on the physicochemical principle of mass action. At given temperatures, the pressure of the carbondioxide necessary to prevent decomposition of a carbonate is definite. This pressure varies with the temperature. The pressure of carbondioxide necessary to prevent decomposition of calcium carbonate at 700° C. is approximately 25 mm. of mercury, while the pressure necessary to prevent decomposition of magnesium carbonate at that temperature is considerably more than an atmosphere of carbondioxide. Therefore, if a suitable pressure between these two values is maintained, during calcination, the magnesium carbonate will decompose, while the calcium carbonate will remain as such. If the temperature is raised, it is only necessary to increase the pressure of the carbondioxide in order to prevent decomposition of the calcium carbonate. At approximately 900° C. the pressure of carbondioxide necessary to prevent decomposition of the calcium carbonate, is one atmosphere of this gas. If, on the other hand, the carbondioxide is carried off as fast as it is formed, as is the case where the present methods of calcination are used, the calcium carbonate will slowly decompose at even a dull heat giving rise to the very objectionable lime. We have succeeded in controlling the pressure, as well as the temperature, in calcining magnesium limestone and have obtained a uniform product free from lime.

The present invention may be carried out with the aid of a relatively simple apparatus, the apparatus shown in the accompanying drawing being an example of one suitable for the purpose.

In the drawing—

Figure 1 represents a side elevation partly in section of a calcining furnace; and Figure 2 represents an end elevation of the furnace as viewed from the left in Figure 1.

The apparatus shown comprises a furnace consisting of an outer brick work 1, the interior of which is hollow to form a heating chamber 2 which is supplied with gas burners 3, or other suitable means for producing and maintaining the requisite calcining temperature therein. A number of retorts 4, arranged preferably vertically, extend through the heating chamber of the furnace, these retorts being conveniently composed of steel tubing or fire clay body, the tops of these retorts being exposed at the top of the furnace to enable them to receive the charges of material to be calcined, while the lower ends of the retorts are exposed at the bottom of the furnace and may discharge the calcined material therefrom. The tops and bottoms of the retorts are preferably flanged, as shown, and provided with caps or covers 5 which may be secured in place by suitable screw clamps 6, asbestos gaskets being preferably placed between the covers and the flanges of the retorts to produce and maintain gas-tight joints. A water seal 7 is provided for each retort, a pipe 8 leading from the top of each retort and having its end submerged to a suitable depth in the water seal. A pressure gage 9 is also preferably provided for each pipe 8 to indicate the pressure of gas in the respective retort.

In carrying out the process of the present invention with the aid of an apparatus such as that shown, the rock to be calcined is placed in the chambers of the retorts and the chambers of the retorts may or may not be filled with carbondioxide before they become heated. The covers of the retorts are applied to tightly close the retorts and the heat supplied to the heating chamber 2 of the furnace, the temperature of which is controlled in any suitable or well known way, raises the temperature of the material within the retorts. When the temperature of the material within the restorts has increased so that the material within these retorts is at a very dull red heat, some of the magnesium carbonate is decomposed, liberating carbondioxide. Since the exit tube 8 of each retort is submerged beneath the level of the liquid in the seal 7, the pressure of the carbondioxide within the respective retort chamber soon becomes greater than one atmosphere. Instead of using a water seal, a relief valve could be fitted to the exit pipe 8 and suitably operated in conjunction with the pressure gage in order to maintain the requisit pressure of carbondioxide in the retort chambers.

We have discovered that temperatures between 700° C. and 900° C. are the best to employ, but if the temperature should rise above its highest limit, it would only be necessary to increase the depth of the water seal or to otherwise increase sufficiently the pressure of the carbondioxide within the retort chambers, in order to prevent decomposition of the calcium carbonate. The pressure within the retort chamber is and should be always under control. The end of the calcination is indicated by a diminution of the bubbles of carbondioxide escaping through the water seal where a water seal is used in place of a relief valve and gage.

We claim:—

1. The process of calcining material containing magnesium and calcium carbonates, which comprises calcining such material while maintained at a carbon dioxide pressure above the dissociation pressure of calcium carbonate and at such temperature as will, at such pressure, decompose substantially all of the magnesium carbonate, giving magnesium oxide, while substantially none of the calcium carbonate is decomposed.

2. The process of calcining rocks containing magnesium and calcium carbonates, which comprises heating the rock to a calcining temperature while contained in a chamber, and so controlling the carbon dioxide pressure in such chamber during calcination that such pressure is maintained above the dissociation pressure of calcium carbonate at such calcining temperature, thereby causing decomposition of substantially all of the magnesium carbonate, giving magnesium oxide, while substantially none of the calcium carbonate is decomposed.

3. The process of calcining rocks containing magnesium and calcium carbonates which consists in calcining the rock within a closed chamber while maintained at a pressure of carbon dioxide higher than one atmosphere during substantially the entire period of decomposition of the rock, while maintained at a calcining temperature which will, at such pressure, decompose substantially all of the magnesium carbonate, giving magnesium oxide, while substantially none of the calcium carbonate is decomposed.

4. The process of calcining rocks containing magnesium and calcium carbonates which consists in calcining the rock while maintained under a pressure of at least one atmosphere of carbon dioxide during the period of calcination and while maintained at a calcining temperature which will, at such pressure, decompose substantially all of the magnesium carbonate, giving magnesium oxide, while substantially none of the calcium carbonate is decomposed.

5. The process of calcining rocks containing magnesium and calcium carbonates, which consists in placing the rock in a closed chamber, heating the rock in said chamber so that at any temperature obtained the carbon dioxide pressure inside the chamber is lower than the dissociation pressure of magnesium carbonate but higher than the dissociation pressure of calcium carbonate for that temperature.

6. The process of calcining rock containing magnesium and calcium carbonates, which comprises placing the rock in a chamber, and heating the rock in such chamber and controlling the carbon dioxide pressure in the chamber during calcination, whereby substantially all of the magnesium carbonate is decomposed, giving magnesium oxide, while substantially none of the calcium carbonate is decomposed.

7. The process of calcining rock containing magnesium and calcium carbonates, which consists in placing the rock in a closed chamber, and heating it in such chamber while maintaining a pressure of carbon dioxide higher than one atmosphere during substantially the entire period of decomposition of the rock, and while maintained at a calcining temperature which, at such pressure, will decompose substantially all of the magnesium carbonate, giving magnesium oxide, while substantially none of the calcium carbonate is decomposed.

8. The process of calcining rock containing magnesium and calcium carbonates, which consists in placing the rock in a closed chamber, heating it in such chamber and maintaining a pressure of at least one atmosphere of carbon dioxide on the rock during the period of calcination, and maintaining the rock during calcination at a calcining temperature which will decompose substantially all of the magnesium carbonate, giving magnesium oxide, while substantially none of the calcium carbonate is decomposed.

9. The process of calcining rock containing magnesium and calcium carbonates, which consists in placing the rock in a closed chamber, heating the rock in said chamber and controlling the pressure of carbon dioxide in the chamber so that at any temperature obtained the pressure inside the chamber is lower than the dissociation pressure of magnesium carbonate but higher than the dissociation pressure of calcium carbonate for that temperature, whereby substantially all of the magnesium carbonate is decomposed, giving magnesium oxide, while substantially none of the calcium carbonate is decomposed.

In testimony whereof we have hereunto set our hands.

JOSEPH B. SHAW.
GEORGE A. BOLE